(12) United States Patent
Rapp et al.

(10) Patent No.: US 8,250,847 B2
(45) Date of Patent: Aug. 28, 2012

(54) COMBINED BRAYTON-RANKINE CYCLE

(75) Inventors: John W. Rapp, Manassas, VA (US); Nicholas J. Nagurny, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 766 days.

(21) Appl. No.: 12/343,954

(22) Filed: Dec. 24, 2008

(65) Prior Publication Data

US 2010/0154381 A1 Jun. 24, 2010

(51) Int. Cl.
*F02C 6/00* (2006.01)

(52) U.S. Cl. .................................................... 60/39.182
(58) Field of Classification Search ............... 60/39.182, 60/39.12, 641.7, 651, 780
See application file for complete search history.

(56) References Cited

U.S. PATENT DOCUMENTS

| | | | |
|---|---|---|---|
| 2,006,985 A | 7/1935 | Claude et al. | |
| 3,459,953 A * | 8/1969 | Brauser et al. | 290/2 |
| 4,014,279 A | 3/1977 | Pearson | |
| 4,055,145 A | 10/1977 | Mager et al. | |
| 4,166,361 A | 9/1979 | Earnest et al. | |
| 4,189,925 A | 2/1980 | Long | |
| 4,210,819 A | 7/1980 | Wittig et al. | |
| 4,210,820 A | 7/1980 | Wittig | |
| 4,214,449 A | 7/1980 | Sorensen | |
| 4,245,475 A | 1/1981 | Girden | |
| 4,333,312 A | 6/1982 | Sorensen | |
| 4,350,014 A | 9/1982 | Sanchez et al. | |
| 4,355,513 A | 10/1982 | Girden | |
| 4,384,459 A | 5/1983 | Johnston | |
| 4,431,069 A * | 2/1984 | Dickinson et al. | 175/61 |
| 4,586,339 A | 5/1986 | Reid et al. | |
| 4,729,217 A * | 3/1988 | Kehlhofer | 60/781 |
| 4,781,029 A | 11/1988 | SerVaas | |
| 5,513,494 A | 5/1996 | Flynn et al. | |
| 5,603,218 A | 2/1997 | Hooper | |
| 5,727,379 A * | 3/1998 | Cohn | 60/39.182 |
| 6,100,600 A | 8/2000 | Pflanz | |
| 6,202,417 B1 | 3/2001 | Beck | |
| 7,178,337 B2 | 2/2007 | Pflanz | |
| 7,224,080 B2 | 5/2007 | Smedstad | |
| 7,555,890 B2 * | 7/2009 | Kurihara et al. | 60/39.182 |
| 2002/0053196 A1 * | 5/2002 | Lerner et al. | 60/39.182 |

FOREIGN PATENT DOCUMENTS

WO 9641079 12/1996

* cited by examiner

*Primary Examiner* — Ehud Gartenberg
*Assistant Examiner* — Phutthiwat Wongwian
(74) *Attorney, Agent, or Firm* — Fogg & Powers LLC

(57) ABSTRACT

A power generation system that comprises a first power generator; a first turbine operable to drive the first power generator; a vaporizer operable to vaporize a working fluid, wherein the vaporized working fluid turns the first turbine; and a condenser operable to condense the vaporized working fluid exiting the first turbine, wherein the condenser is coupled to the vaporizer such that the condensed working fluid is vaporized in the vaporizer. The power generation system also comprises a second power generator; a second turbine operable to burn a fuel to drive the second power generator; a switch to selectively operate the second turbine independently of the first turbine; and a heat exchanger coupled to the second turbine to receive flue gas from the second turbine when operated, wherein heat is transferred in the heat exchanger from the flue gas to the vaporized working fluid after the vaporized working fluid exits the vaporizer and prior to the vaporized working fluid entering the first turbine.

13 Claims, 4 Drawing Sheets

COMBINED BRAYTON-RANKINE CYCLE

BACKGROUND

Many power generation plants operate a Rankine cycle heat engine. In a Rankine cycle heat engine, a working fluid is vaporized to drive a vapor turbine and then condensed to a liquid to be vaporized again. An exemplary power generation plant which operates a Rankine cycle heat engine is an Ocean Thermal Energy Conversion (OTEC) plant. In an OTEC plant, cool sea water is pumped from deep in the ocean and used to condense a working fluid. Hot surface sea water heated by the sun is then used to vaporize the working fluid. Other exemplary power generation plants which operate a Rankine cycle heat engine include coal, natural gas, oil, and nuclear power generation plants.

Other power generation plants operate a Brayton cycle engine. In a Brayton cycle engine, compressed air runs through a mixing chamber where fuel is added. The pressurized air and fuel mixture is then burned to drive a gas or combustion turbine. Some natural gas power generation plants operate using a Brayton cycle engine. In addition, some power generation plants combine the Brayton and Rankine cycles.

SUMMARY

In one embodiment, a power generation system is provided. The power generation system comprises a first power generator; a first turbine operable to drive the first power generator; a vaporizer operable to vaporize a working fluid, wherein the vaporized working fluid turns the first turbine; and a condenser operable to condense the vaporized working fluid exiting the first turbine, wherein the condenser is coupled to the vaporizer such that the condensed working fluid is vaporized in the vaporizer. The power generation system also comprises a second power generator; a second turbine operable to burn a fuel to drive the second power generator; a switch to selectively operate the second turbine independently of the first turbine; and a heat exchanger coupled to the second turbine to receive flue gas from the second turbine when operated, wherein heat is transferred in the heat exchanger from the flue gas to the vaporized working fluid after the vaporized working fluid exits the vaporizer and prior to the vaporized working fluid entering the first turbine.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Like reference numbers and designations in the various drawings indicate like elements.

DETAILED DESCRIPTION

Figure 1:
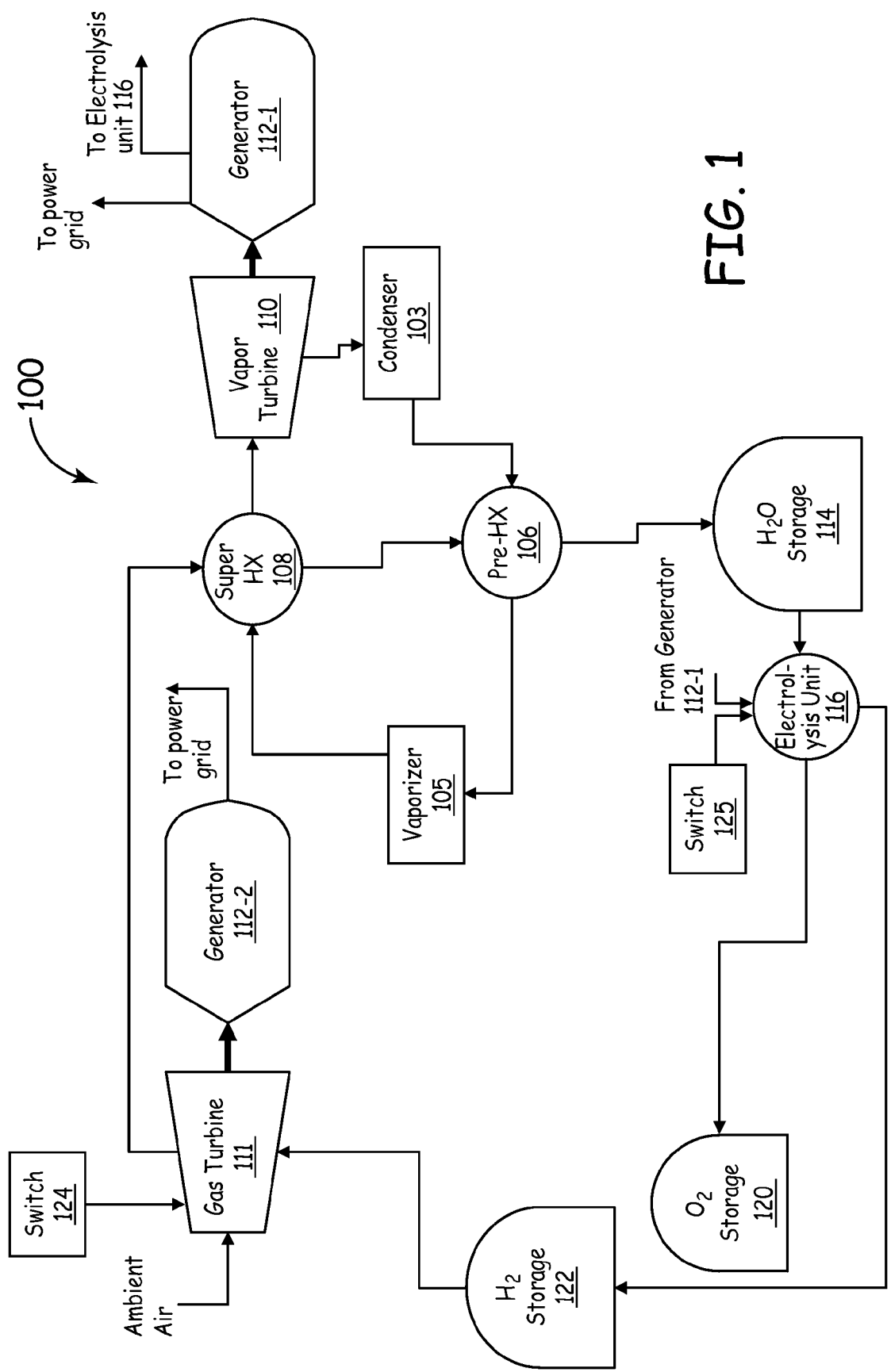
FIG. 1 is a block diagram of one embodiment of a combined Brayton-Rankine system.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures or the specification is not to be construed as limiting the order in which the individual steps may be performed. The following detailed description is, therefore, not to be taken in a limiting sense.

FIG. 1A is a block diagram of one embodiment of a combined Brayton-Rankine power generation system 100. In particular, system 100 includes a vaporizer 105, a condenser 103, a vapor turbine 110, and a generator 112-1 which form part of the Rankine cycle. A working fluid is cooled and condensed in the condenser 103. The working fluid in liquid state is then converted to vapor the vaporizer 105. The pressure of the vapor drives the vapor turbine 110, which is coupled to the generator 112-1, to produce electricity. The working fluid is then condensed again in condenser 103. In this exemplary embodiment, the working fluid is ammonia, which has a relatively low boiling point compared to water. However, it is to be understood that, in other embodiments, other working fluids can be used. For example, other working fluids include, but are not limited to, hydrocarbons (e.g. butane, propane, propylene, etc.) and liquid fluorocarbons (e.g tetrafluoroethane).

In addition, system 100 includes a gas turbine 111 (also known as a combustion turbine) coupled to a generator 112-2. The gas turbine 111 forms part of the Brayton cycle. In particular, hydrogen from the hydrogen storage 122 is mixed with oxygen from ambient air and then burned to drive gas turbine 111. In some embodiments, more ambient air is drawn into the mixture than is burned. Drawing more ambient air than is burned reduces the burn rate enabling the mixture to burn at lower temperatures. Hence, although Hydrogen burns at a higher temperature than natural gas, by reducing the burn temperature, a gas turbine designed for natural gas can be used in such embodiments. This reduces the upfront construction costs of system 100 by enabling the use of less expensive natural gas turbines.

The heated flue gas from the vapor turbine 111 is passed to a super-heating heat exchanger 108. Due to the high pressure of the heated flue gas, a pump is not needed to transport the flue gas to the super-heating heat exchanger 108. The super-heating heat exchanger 108 is placed between vaporizer 105 and vapor turbine 110. Thus, the super-heating heat exchanger boosts the temperature of the vaporized working fluid beyond the temperature achievable by the vaporizer 105 alone. By increasing the temperature of the vaporized working fluid as it enters the vapor turbine 110, the efficiency of the vapor turbine 110 is also increased.

For example, the temperature of vaporized ammonia exiting vaporizer 105 is typically around 22° C. The temperature of the heated flue gas exiting the gas turbine 111 is typically between approximately 450°-650° C. The amount of temperature increase achieved in the super-heating heat exchanger 108 depends on the mass flow rate of the vaporized working fluid and the mass flow rate of the heated flue gas. However, if the temperature of the vaporized ammonia is increased from around 22° C. to around 100° C., the amount of power produced by the vapor turbine 110 and the generator 112-1 will increase approximately 54%. Similarly, if the temperature of the vaporized ammonia is increased to around 50° C., the amount of power produced will increase approximately 22%. The above exemplary temperature values and associated increases in power are based on the properties of ammonia as described in 2005 *ASHRAE Handbook of Fundamentals*, Chapter 20 Thermophysical Properties of Refrigerants. However, it is to be understood that the above exemplary values are provided for purposes of explanation only.

Figure 4:
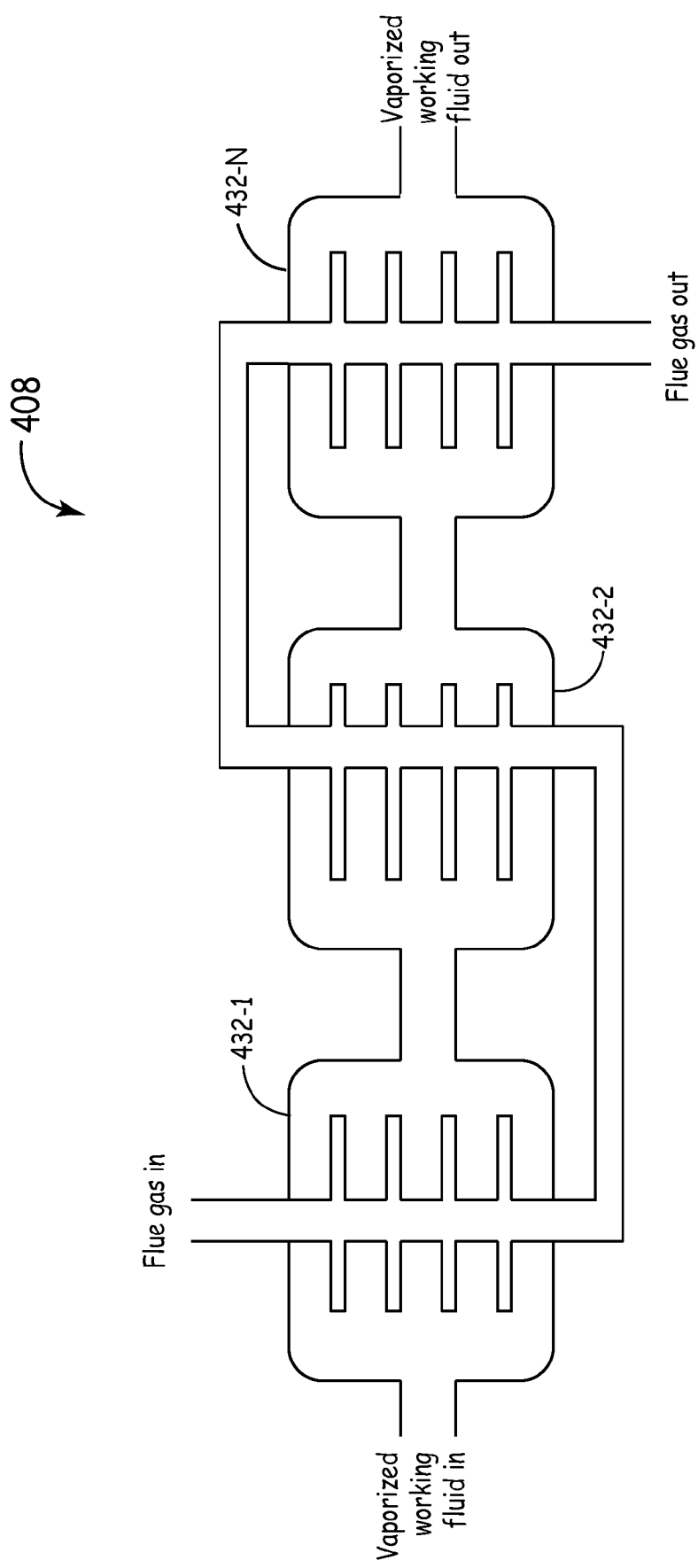
FIG. 4 is a block diagram of one embodiment of a heat exchanger having multiple stages.

Hence, the super-heating heat exchanger 108 transfers heat from the flue gas of the gas turbine 111 to the vaporized working fluid in order to increase the efficiency of the vapor turbine 110. In addition, in some embodiments, the super-heating heat exchanger 108 is implemented in multiple stages to transfer more heat from the heated flue gas to the vaporized working fluid. For example, FIG. 4 shows an exemplary embodiment of a super-heating heat exchanger 408 implemented with a plurality of stages 432-1 ... 432-N. Each stage 432 transfers heat from the flue gas to the vaporized working fluid. In addition, although not shown, stages 432-1 ... 432-N are adapted for hot water condensate to collect out of the flue gas, as known to one of ordinary skill in the art.

In some embodiments, the flue gas also passes through the pre-heating heat exchanger 106 located between the condenser 103 and the vaporizer 105. The temperature of the flue gas after passing through the super-heating heat exchanger 108 drops. In deed, depending on the amount of heat transferred, the flue gas may begin to condense. However, the temperature of the flue gas is still typically higher than the temperature of the condensed working fluid. Thus, in embodiments implementing the pre-heating heat exchanger 106, heat is transferred from the flue gas to the condensed working fluid prior to entering the vaporizer 105. In addition, as with the super-heating heat exchanger 108, the pre-heating exchanger 106 is implemented in multiple stages, in some embodiments.

Increasing the temperature of the condensed working fluid in the pre-heating heat exchanger 106 reduces the amount of work necessary for the vaporizer 105 to vaporize the working fluid. Thus, the mass flow rate of the vaporized working fluid exiting the vaporizer 105 is increased because more of the working fluid can be vaporized with the same amount of work done by the vaporizer 105. In addition, the change in temperature necessary to vaporize the working fluid is decreased resulting in a higher temperature working fluid which further increases the efficiency of the vapor turbine 110.

The transfer of heat from the flue gas to the working fluid in the super-heating heat exchanger 108 and the pre-heating heat exchanger 106 helps condense the flue gas to potable water. The potable water is stored in water storage 114. The potable water can be used for human consumption or other water needs in a power generation plant implementing system 100. In addition, at least a portion of the potable water in water storage 114 is electrolyzed into hydrogen and oxygen in electrolysis unit 116. Power to run electrolysis unit 116 is supplied by generator 112-1. The hydrogen is then stored in hydrogen storage 122 and the oxygen is stored in oxygen storage 120. In addition, switch/regulator 125 is used, in some embodiments, to control the timing and rate of electrolysis. For example, in some such embodiments, electrolysis unit 116 is operated during off peak hours when the Brayton Cycle is not running. Furthermore, in this example, switch/regulator 125 is operable to adjust the rate of electrolysis in addition to turning on or off electrolysis unit 116.

The hydrogen in hydrogen storage 122 is then combined with oxygen from the ambient air and burned in the gas turbine 111. Thus, the Brayton cycle is closed for hydrogen. However, oxygen is continually added from the ambient air while the gas turbine 111 is operating. As a consequence, the amount of oxygen stored in oxygen storage 120 increases when the resulting potable water is electrolyzed. Hence, system 100 collects oxygen as a by-product of operation. This stored oxygen can be used for other purposes or sold to reduce costs of operation of the system 100.

Additionally, system 100 includes switch/regulator 124 in this embodiment. Switch/regulator 124 turns the gas turbine 111 on and off. In addition, in this example, switch/regulator 124 is operable to adjust the amount of fuel burned by gas turbine 111. Adjusting the amount of fuel burned adjusts the additional amount of power produced by generator 112-2 as well as the amount of heat transferred in super-heating heat exchanger 108 and pre-heating heat exchanger 106. Additionally, by turning the gas turbine 111 on and off, switch/regulator 124 enables system 100 to operate in a combined Brayton-Rankine mode, as described above, or to operate in a Rankine only mode. In other words, switch/regulator 124 enables gas turbine 111 to be selectively operated independently of vapor turbine 110. As used herein, independent operation is defined as meaning the operation of each turbine is not dependent on the operation of the other. For example, in this embodiment, even when gas turbine 111 is turned off by switch/regulator 124, vapor turbine 110 can continue to operate since vaporizer 105 and condenser 103 continue to operate. Similarly, gas turbine 111 can operate even if vapor turbine 110 is turned off.

When the gas turbine 111 is turned off, the heated flue gas will not pass through the super-heating heat exchanger 108 or the pre-heating heat exchanger 106. Thus, the Rankine only mode includes the condenser 103, the vaporizer 105, the vapor turbine 110, and the generator 112-1 since the heat transfer in the super-heating exchanger 108 and the pre-heating heat exchanger 106 is effectively bypassed by turning the gas turbine 111 off. Thus, switch/regulator 124 enables management of system 100.

In particular, switch/regulator 124 enables selective operation of the combined Brayton-Rankine cycle to meet power demands. For example, in some embodiments, switch/regulator 124 turns on the gas turbine 111 whenever power demands exceed the base load power provided by operating the Rankine cycle alone. In other embodiments, switch/regulator 124 only turns on the gas turbine 111 during periods of historically high power demands. Additionally, switch/regulator 124 can be used to adjust the amount of fuel burned in gas turbine 111 based on power demands, in some embodiments, as described above.

The system 100, therefore, can be designed for a lower base load power output than conventional power generation systems while still meeting the peak power demands. For example, if the peak power demand on a power generation system is 10 megawatts while off-peak demand is 6 megawatts, a conventional system is designed to provide 10 megawatts to avoid power shortages. However, system 100 can be designed to provide 7 megawatts using the Rankine mode alone, while being able to provide the peak demand of 10 megawatts when operating in combined Brayton-Rankine mode. Thus, the initial upfront construction costs of system 100 are reduced since a smaller 7 megawatt system can be used in place of the larger 10 megawatt system. In other words, smaller pumps, turbines, etc. can be used which are less expensive than their larger counterparts.

Figure 2:
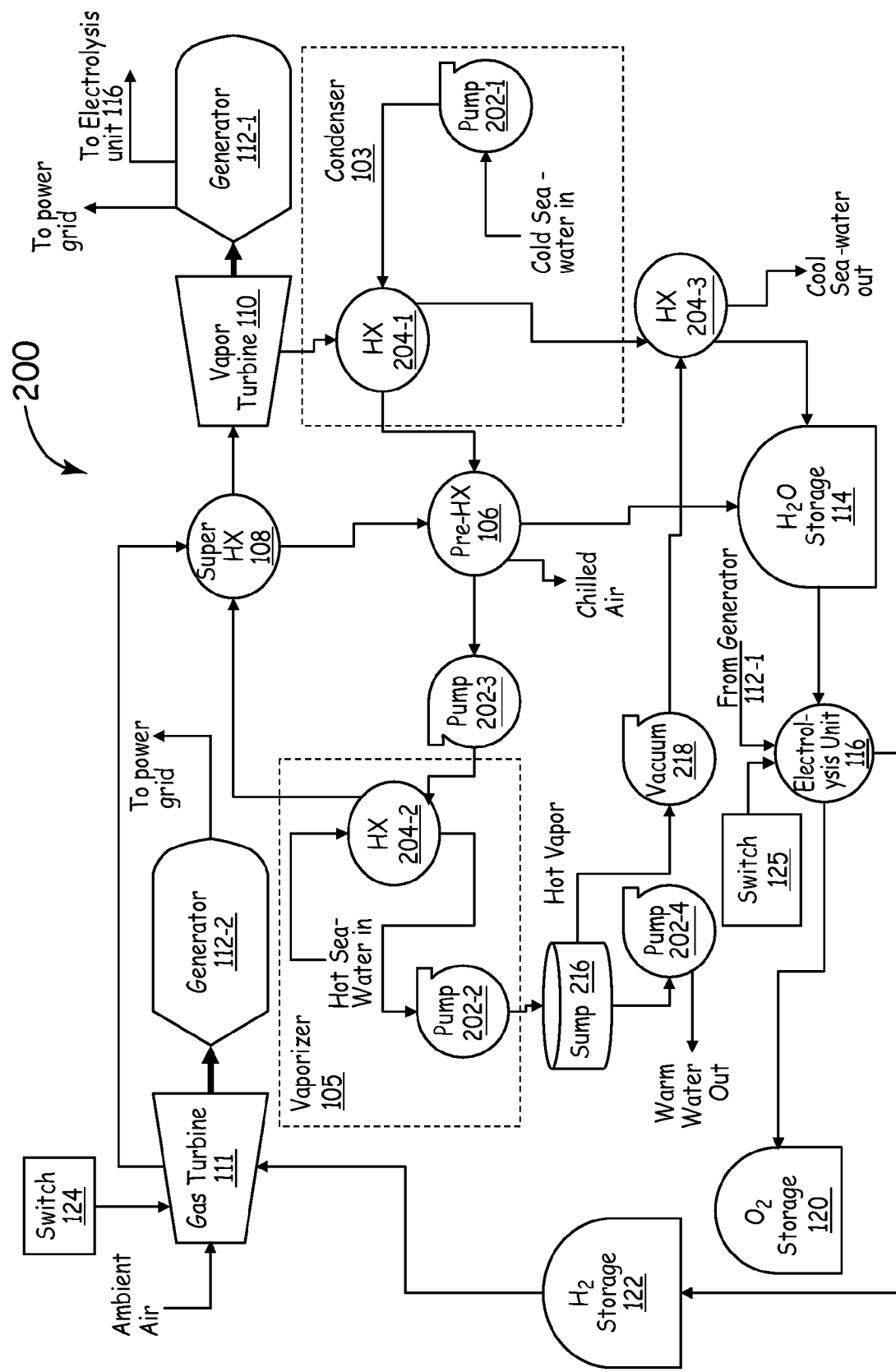
FIG. 2 is a block diagram of one embodiment of a combined Brayton-Rankine Ocean Thermal Energy Conversion system.

FIG. 2 is a block diagram of the combined Brayton-Rankine power generation system 100 implemented in an Ocean Thermal Energy Conversion (OTEC) plant. In particular, condenser 103 comprises a pump 202-1 that pumps cold water from deep within the body of water to near the surface. The cold water is pumped through heat exchanger 204-1. Heat from the vaporized working fluid is passed from the working fluid to the cold water in heat exchanger 204-1 to condense the working fluid. As used herein, "cold water" is defined as water having a temperature sufficiently lower than the temperature of the vaporized working fluid to enable the working fluid to condense when heat is transferred from the vaporized working fluid to the cold water. For example, in some embodiments, the cold water has a temperature of approximately 4-6 degrees Celsius. Pump 202-3 pumps the liquid working fluid through pre-heating heat exchanger 106 to vaporizer 105. When operating, pre-heating heat exchanger 106 transfers heat to the working fluid from heated flue gas from the gas turbine 111, as described above.

Vaporizer 105, in this embodiment, comprises heat exchanger 204-2 and pump 202-2. Pump 202-2 pumps hot surface water, which is heated by the sun, through heat exchanger 204-2. Heat from the hot surface water is transferred to the working fluid in heat exchanger 204-2 to vaporize the working fluid. As used herein, "hot water" or "hot surface water" is defined as water having a temperature sufficiently higher than the temperature of the condensed working fluid to enable the working fluid to vaporize when heat is transferred from the "hot water" to the condensed working fluid. For example, in some embodiments, the hot water has a temperature of about 25-27 degrees Celsius. As described above, when pre-heating heat exchanger 106 is used, the work required to vaporize the working fluid is reduced which results in increased mass flow rate and/or higher temperatures of the vaporized working fluid.

The pressure of the vaporized working fluid pushes the working fluid through super-heating heat exchanger 108 to vapor turbine 110. As described above, when in operation, super-heating heat exchanger 108 further increases the temperature of the vaporized working fluid by transferring heat from the heated flue gas to the working fluid. The super-heated working fluid then drives turbine 110 to produce electricity with generator 112-1, as described above.

The hot surface water pumped through heat exchanger 204-2 by pump 202-2 is pumped to sump 216. Hot vapor is produced from the hot surface water in sump 216 by flash vaporization and is transferred to heat exchanger 204-3 by vacuum 218 while the remaining previously hot surface water is pumped back to the body of sea water by pump 204-4. In heat exchanger 204-3, the hot vapor is condensed to potable water as heat is transferred from the hot vapor to the cold water exiting heat exchanger 204-1. The potable water is then stored in water storage 114. Also stored in water storage 114 is the condensed flue gas water, as described above. In addition, humidity in the air that comes in through the intakes of gas turbine 111 is chilled by the cold sea water, and is included in the condensate output from pre-heating heat exchanger 106. The chilled and dry flue gas air can then be used to air condition the OTEC plant operating system 200 which further reduces costs associated with operation of the OTEC plant.

At least a portion of the stored water is then electrolyzed in electrolysis unit 116, as described above. Hydrogen from electrolysis unit 116 is stored in hydrogen storage 122 and oxygen is stored in oxygen storage 120. Hydrogen from hydrogen storage 122 is combined with ambient air and burned in gas turbine 111 to produce electricity with generator 112-2 coupled to gas turbine 111. The heated flue gas from gas turbine 111 passes through super-heating heat exchanger 108 and pre-heating heat exchanger 106 as described above. When switch 124 turns off gas turbine 111, system 200 continues to produce electricity via the Brayton cycle (i.e. condenser 103, vaporizer 105, vapor turbine 110 and generator 112-1) as described above. Thus, gas turbine 111 is used, in this embodiment, to produce additional electricity to meet peak demands. In addition, pre-heating heat exchanger 106 and super-heating heat exchanger 108 increase the electricity output of generator 112-2 to meet peak demands as described above. This enables a smaller OTEC plant to be produced which reduces initial investment costs associated with manufacture of the OTEC plant.

Figure 3:
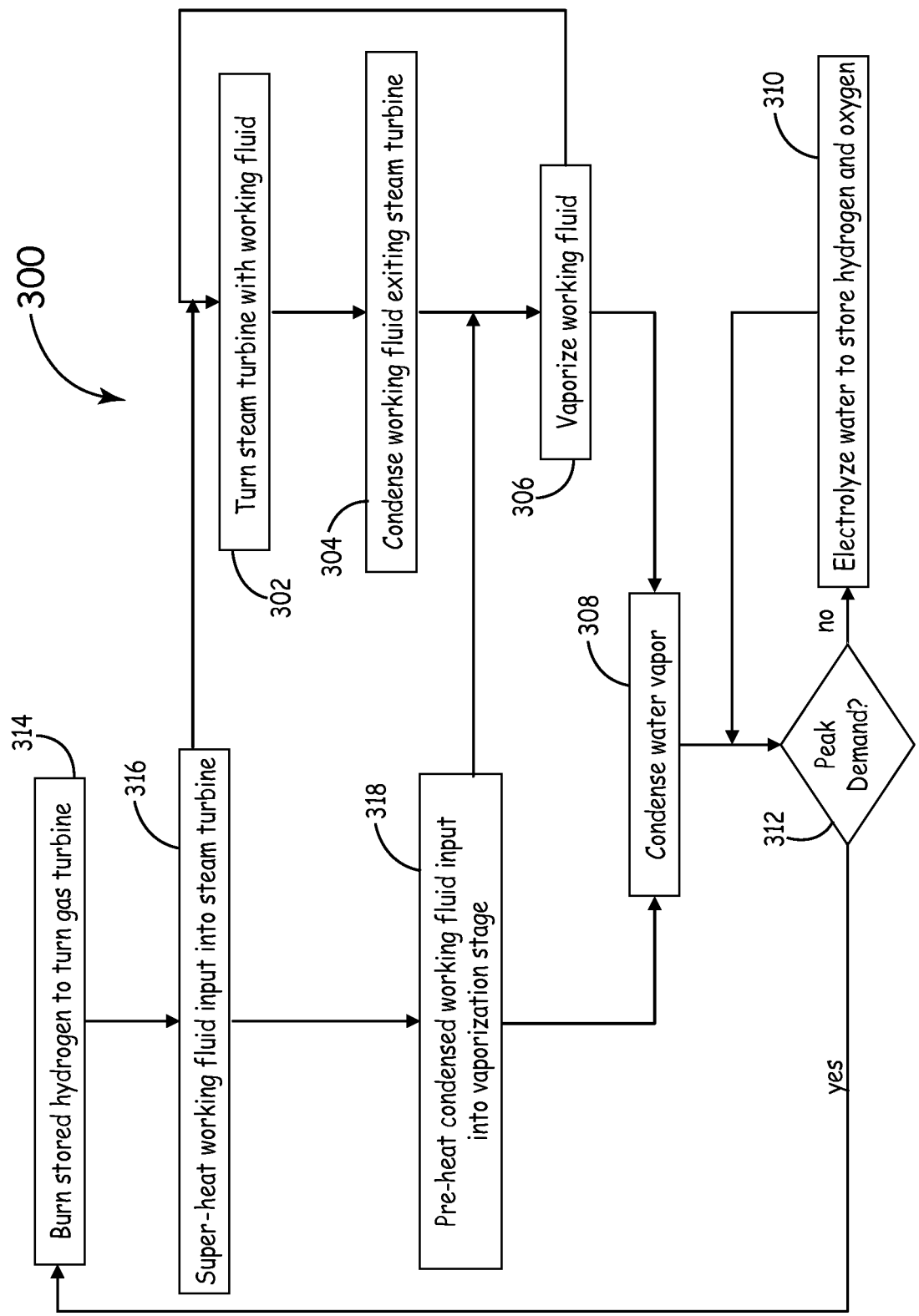
FIG. 3 is a flow chart of one embodiment of a method of operating a combined Brayton-Rankine system.

FIG. 3 is a flow chart of a method 300 of operating a combined Brayton-Rankine system such as systems 100 and 200 above. At block 302, a vaporized working fluid turns the vapor turbine 110 which produces a first level of power with generator 112-1. In some embodiments, the working fluid is ammonia as described above. In other embodiments, other working fluids are used. At block 304, the vaporized working fluid exiting the vapor turbine 110 is condensed in condenser 103. In particular, in some embodiments, the working fluid is condensed by transferring heat in heat exchanger 204-1 from the working fluid to cold sea water pumped from deep in the body of water by pump 202-1. At block 306, the condensed working fluid is vaporized in the vaporizer 105. In particular, in some embodiments, the working fluid is vaporized by transferring heat in the heat exchanger 204-2 from hot surface sea water to the working fluid. Method 300 loops to block 302, where the vaporized working fluid again turns the vapor turbine 110.

Hot vapor from the hot sea water is also condensed at block 308 and stored in the water storage 114. At block 310, it is determined if power demands are peaking beyond the first level of power. In this embodiment, the first level of power is the base load power produced by the vapor turbine 110. If power demands are not peaking, method 300 continues at block 312 where at least a portion of the stored water is electrolyzed into hydrogen and oxygen which are stored in hydrogen storage 122 and oxygen storage 120, respectively. Method 300 then loops back to block 310 until demands are exceeding the base load power. Thus, method 300 is divided into two periods of time at block 312. During the first period of time only the Rankine cycle is operating. That is, only the processes of blocks 302-312 occur during the first period of time. During the second period of time, which overlaps with and is a subset of the first period of time, both the Rankine and the Brayton cycles are operating. That is, the processes of blocks 314-318 also occur.

In particular, when it is determined at block 310 that demands are exceeding the base load power produced by the vapor turbine 110, the stored hydrogen is burned with ambient air, at block 314, in the gas turbine 111 which produces additional power via generator 112-2. Hot flue gas from the gas turbine 111 passes through the super-heating heat exchanger 108, at block 316, where additional heat is transferred to the vaporized working fluid prior to entering the vapor turbine 110 at block 302. The hot flue gas also passes through the pre-heating heat exchanger 106, at block 318, where additional heat is transferred to the condensed working fluid prior to being vaporized in the vaporizer 105 at block 306. The heated flue gas is then condensed at block 308. The condensed flue gas is stored in water storage 114 at block 310. If peak demands continue to exceed the base load power, at block 310, method 300 loops to block 314 where additional hydrogen is burned. If demands no longer exceed the base load power, method 300 loops at block 310 until demands again exceed the base load power. Additionally, the decision at block 310 can adjust, in some embodiments, the rate of electrolysis at block 312 and/or the amount of fuel burned at block 314. For example, as demand increases the amount of fuel burned increases, whereas if demand decreases, the rate of electrolysis increases.

Although specific embodiments have been illustrated and described herein, it will be appreciated by those of ordinary skill in the art that any arrangement, which is calculated to achieve the same purpose, may be substituted for the specific embodiments shown. For example, although systems 100 and 200 are shown and described as burning hydrogen in gas turbine 111, it is to be understood that, in other implementations, other fuels are used. In particular, in some land-based implementations, natural gas is burned in gas turbine 111. In other embodiments, system 200 is implemented on a floating platform at sea. In some such embodiments, gases, such as methane, are extracted from ocean or sea water to be burned in gas turbine 111. For example, techniques described in United States Patent Application No. 2008/0295517 can be used to extract the gas burned in turbine 111. In some implementations in which hydrogen is not burned in gas turbine 111, electrolysis unit 116, oxygen storage 120, and/or hydrogen storage 122 are not included in systems 100 and 200. Therefore, it is manifestly intended that this invention be limited only by the claims and the equivalents thereof.

What is claimed is:

1. A power generation system comprising:
    a first power generator;
    a first turbine operable to drive the first power generator;
    a vaporizer operable to vaporize a working fluid, wherein the vaporized working fluid turns the first turbine;
    a condenser operable to condense the vaporized working fluid exiting the first turbine, wherein the condenser is coupled to the vaporizer such that the condensed working fluid is vaporized in the vaporizer;
    a second power generator;
    a second turbine operable to burn a fuel to drive the second power generator;
    a switch to selectively operate the second turbine independently of the first turbine, wherein operation of the first turbine is independent of operation of the second turbine; and
    a heat exchanger coupled to the second turbine to receive flue gas from the second turbine when operated, wherein heat is transferred in the heat exchanger from the flue gas to the vaporized working fluid after the vaporized working fluid exits the vaporizer and prior to the vaporized working fluid entering the first turbine;
    wherein the condenser comprises:
        a first pump operable to pump cold water from within a body of water to near a surface of the body of water; and
        a condenser heat exchanger coupled to the first pump and to the first turbine to receive the cold water and the vaporized working fluid, wherein heat is transferred in the condenser heat exchanger from the vaporized working fluid to the cold water to condense the working fluid; and
    wherein the vaporizer comprises:
        a vaporizer heat exchanger coupled to the condenser heat exchanger to receive the condensed working fluid; and
        a second pump operable to pump hot water from the surface of the body of water through the vaporizer heat exchanger such that heat from the hot water is transferred in the vaporizer heat exchanger to the condensed working fluid to vaporize the working fluid.

2. The power generation system of claim 1, wherein the heat exchanger is a first heat exchanger and further comprising a second heat exchanger coupled to the first heat exchanger to receive the flue gas, wherein heat is transferred in the second heat exchanger from the flue gas to the condensed working fluid after the condensed working fluid exits the condenser and prior to the condensed working fluid entering the vaporizer.

3. The power generation system of claim 1, wherein the working fluid comprises ammonia.

4. The power generation system of claim 1, wherein the fuel burned in the second turbine comprises hydrogen mixed with ambient air.

5. The power generation system of claim 4, further comprising:
    a water storage unit to store the flue gas in a condensed state after the flue gas passes through the heat exchanger;
    an electrolysis unit coupled to the water storage unit to electrolyze at least a portion of the condensed flue gas into hydrogen and oxygen;
    a hydrogen storage unit to store the hydrogen; and
    an oxygen storage unit to store the oxygen.

6. The power generation system of claim 5, wherein the amount of oxygen stored due to electrolyzing the condensed flue gas increases as the second turbine is operated.

7. The power generation system of claim 1, wherein the fuel burned in the second turbine comprises hydrogen mixed with more ambient air than is burned to lower the temperature at which the hydrogen is burned.

8. The power generation system of claim 1, wherein the heat exchanger comprises a plurality of stages.

9. An ocean thermal energy conversion system comprising:
    a first power generator;
    a first turbine operable to drive the first power generator;
    a first heat exchanger to vaporize a working fluid, wherein the vaporized working fluid turns the first turbine;
    a first pump operable to pump hot water from a surface of a body of water through the first heat exchanger such that heat from the hot water is transferred in the first heat exchanger to the working fluid to vaporize the working fluid;
    a second pump operable to pump cold water from within the body of water to near the surface of the body of water;
    a second heat exchanger coupled to the second pump and to the first turbine to receive the cold water and the vaporized working fluid, wherein heat is transferred in the second heat exchanger from the vaporized working fluid to the cold water to condense the working fluid;
    wherein the second heat exchanger is coupled to the first heat exchanger such that the condensed working fluid is vaporized in the first heat exchanger;
    a second power generator;
    a second turbine operable to burn a fuel to drive the second power generator;
    a third heat exchanger coupled to the second turbine to receive flue gas from the second turbine, wherein heat is transferred in the third heat exchanger from the flue gas to the vaporized working fluid after the vaporized working fluid exits the first heat exchanger and prior to the vaporized working fluid entering the first turbine; and
    a fourth heat exchanger coupled to the third heat exchanger to receive the flue gas, wherein heat is transferred in the fourth heat exchanger from the flue gas to the condensed working fluid after the condensed working fluid exits the second heat exchanger and prior to the condensed working fluid entering the first heat exchanger.

10. The ocean thermal energy conversion system of claim 9, wherein the working fluid is one of ammonia.

11. The ocean thermal energy conversion system of claim 9, further comprising:
   a water storage unit to store the flue gas in a condensed state after the flue gas passes through the fourth heat exchanger, wherein the fuel burned to turn the second turbine is hydrogen mixed with ambient air;
   an electrolysis unit coupled to the water storage unit to electrolyze at least a portion of the condensed flue gas into hydrogen and oxygen;
   a hydrogen storage unit to store the hydrogen; and
   an oxygen storage unit to store the oxygen.

12. The ocean thermal energy conversion system of claim 11, wherein the amount of oxygen stored due to electrolyzing the condensed flue gas increases as the second turbine is operated.

13. The ocean thermal energy conversion system of claim 9, further comprising a switch to selectively operate the second turbine independently of the first turbine.

* * * * *